Patent content …

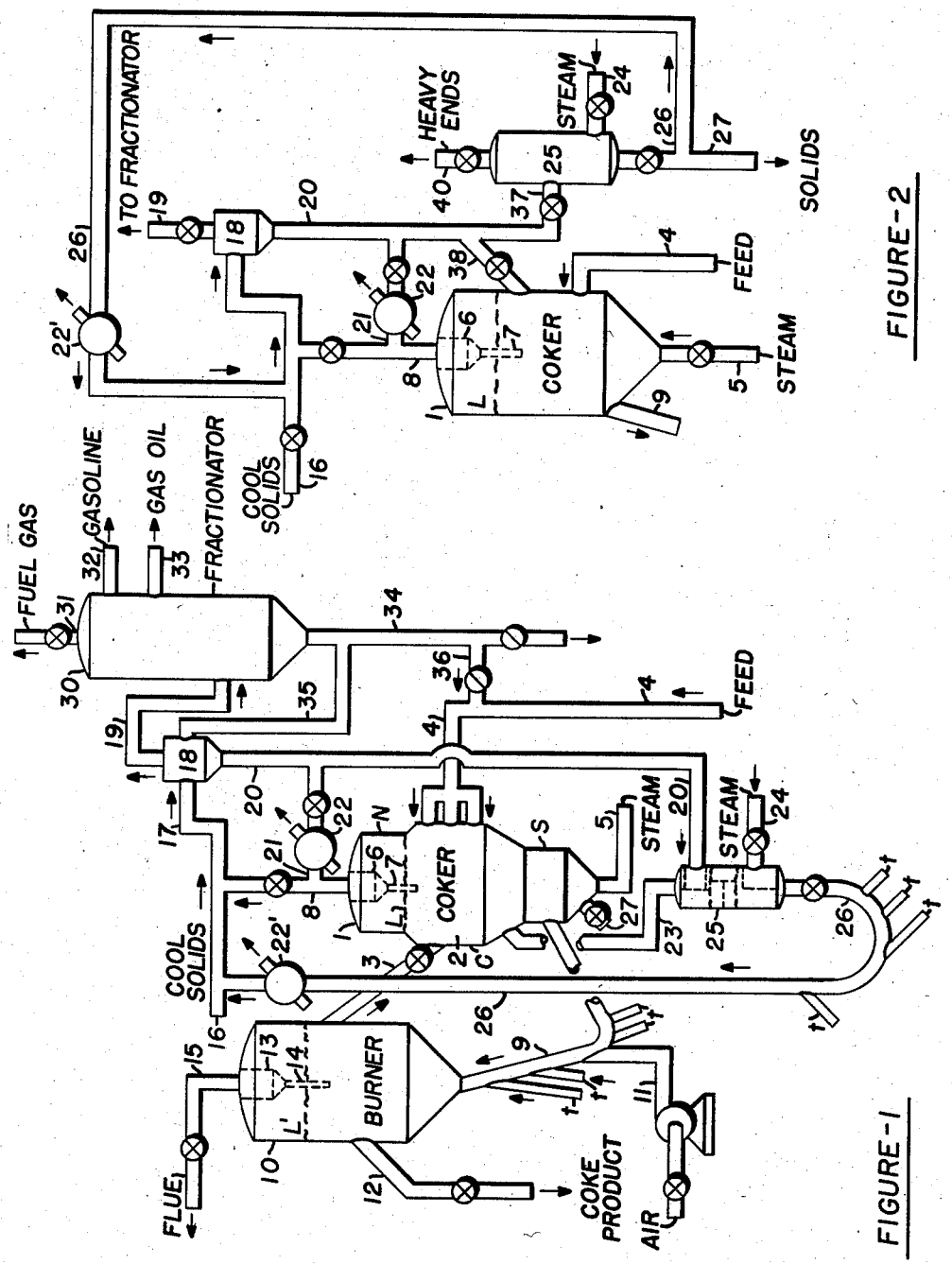

2,885,348

FLUID COKING PROCESS

James W. Brown, Elizabeth, N.J., and John F. Moser, Jr., Baton Rouge, La., assignors to Esso Research and Engineering Company, a corporation of Delaware Application January 20, 1954, Serial No. 405,134

2 Claims. (Cl. 208—102)

This invention relates to an improved fluid coking process. Specifically the invention is concerned with a method for quenching the overhead product from the coking vessel by contacting it with a stream of cool inert solids. The object of this invention is to prevent coking of the product removal lines and to remove contaminants and heavy ends from the coker effluent.

It has previously been proposed to convert heavy hydrocarbon oils such as heavy crudes, reduced crudes, vacuum still residues, tars, pitches, etc. to gasoline, gas oil, gas, etc., by contacting such oils with fluidized masses of hot inert solid particles. The use of a fluid bed of preheated solid particles is an efficient method for transferring heat and obtaining intimate contact between solid particles and gaseous vaporous, or liquid hydrocarbons, for continuous removal of coke and for quick removal of cracked products.

Thus in a preheated bed of inert finely divided preheated particles, such as coke, sand, pumice, Carborundum, metal shot, ceramic beads, etc., of particle size between about 20 and 400 microns average particle diameter rapid conversion of the oil takes place, with some degradation to coke. The solid particles are usually preheated to a temperature within the range of about 900° F. to 1200° F. in a burner. They are fluidized in the coking vessel by passing an unreactive gas such as steam upwardly through them, with suitable dispersion to accomplish fluidization as is well known in the art.

The oil to be converted is preferably preheated but not up to its cracking temperature. Preheating to a temperature between 300° F. and about 750° F. is usually preferred. The preheated oil is sprayed or otherwise dispersed as uniformly as practicable throughout the bed. Some of the oil may be in vapor phase but a large part of it, as a rule, is in liquid phase and it contacts and coats the solid particles with a wet oil film. The hot particles partially vaporize and partially crack the oil film, with the result that oil vapors are evolved and coke or a carbonaceous residue is deposited upon the particles. The process is endothermic and the particles are cooled. Periodically they must be reheated and this is usually accomplished by withdrawing them from the reaction zone to a separate heating zone. In the latter, a combustion supporting gas such as air or oxygen contacts the particles and reheats them by burning off a portion of the carbonaceous deposits or, alternatively, a combustible fuel such as gas, torch oil, etc., is fed along with the air or oxygen to supply the heat.

The process above described is effective and reasonably efficient. Coke particles produced in the process from decomposition of the heavy oil are the preferred solids although metal particles, refractory mineral particles, etc., may be used instead. In general, the process evolves a considerable quantity of gas and/or vapor which flows upwardly out of the bed of solids to a suitable recovery system. In many cases, however, this stream includes droplets of unconverted feed, or heavy ends of boiling range higher than is desired in the products or in subsequent processing operations. A gas oil rather than a motor fuel is usually desired as the major coker product. Coker gas oil, if of suitable quality, can be cracked catalytically to produce high grade motor gasoline, whereas coker gasoline is often of relatively inferior quality.

However, if the gas oil carried over from the coker contains substantial proportions of heavy uncracked ends, e.g. components boiling above about 1000° F., considerable difficulty may arise. The heavy products themselves form objectionable coke and heavy tar deposits in the product lines and subsequent processing equipment. They are likely to contain objectionable ash or ash-forming constituents which are potent catalyst poisons and, if not removed by condensation of the 1000° F.+ hydrocarbons, cause rapid inactivation of cracking catalysts employed in subsequent cracking of the coker gas oil. Also the heavy ends form relatively high catalytic carbon in subsequent catalytic cracking operations.

A primary object of the present invention is to prevent or substantially reduce the carryover of heavy coker product constituents and thereby improve their quality. It is also an object of this invention to prevent coking and subsequent clogging of the overhead product lines. These objects are accomplished according to the present invention by introducing a stream of cooled inert solids, e.g., preferably coke particles, into the effluent stream from the coker to quench the overhead stream. Heavy condensed liquids plus some volatile material deposits on the solid particles. The solid particles plus condensed liquids and volatile contaminants are separated from the lighter components in a conventional cyclone. These solid particles may be returned as such to the coking zone or the heavy components may be stripped therefrom and the latter returned to the coking zone.

The process of the present invention accomplishes two beneficial effects: (1) the temperature at the coker outlet is lowered to the point where coking problems are eliminated in the entire overhead system, namely, the product withdrawal lines, cyclones and subsequent fractionation equipment; and (2) a small amount of heavy ends is condensed on the solids together with volatile contaminants. The amount of condensation and contaminant removal is easily controlled to the optimum for each coking feed stock by adjusting the temperature of the solids quench. The use of solids as a quench has definite advantages over a liquid quench or scrubbing system. The latter is more difficult to operate and is more sensitive than the solids quench. Coking is very likely to occur around a liquid quench point. Furthermore, liquid quenching must be done after the reactor cyclones because of the large amount of entrained solids which would otherwise have to be handled as a slurry. In addition a liquid scrubbing system has to be run at about 750° F. or at a lower temperature to prevent coking in the scrubber. At these temperatures considerably more liquid is condensed than necessary to remove contaminants and obtain the minimum amount of quenching. The condensed liquid is usually returned to the coker. This raises the recycle rate; reduces the yield of catalyst feed, and produces more low octane coker naphtha.

In the preferred operations of the present invention a stream of finely divided solid particles, preferably coke particles, is introduced at a relatively high velocity in a fluidized stream into the gaseous products emerging from the coking vessel. Due to the relatively coarse size of the particles employed in the coking process, it is not at all times necessary to pass the coker effluent through a primary cyclone before the effluent is contacted with the quench solids. The quench solids together with any solids entrained in the effluent are easily removed in a cyclone after the quenching has taken place.

The invention will be more readily understood by reference to the attached figures in which Figure 1 shows the operation of the quench system in conjunction with the overall coking process. Figure 2 shows a modification involving a different handling of the quench solids to remove condensed materials therefrom.

Referring to Figure 1, vessel 1 is a coking vessel constructed of suitable material for operations at temperatures in the range of 850° F. to 1200° F., preferably in the area of 900° F. to 1100° F. The vessel has a lower narrow stripping section "S," a bulged center portion "C" which is the coking section proper, and a necked top section "N" which encloses an optional cyclone or similar gas-solids separator 6. A bed of solid inert particles 2, preheated to a sufficient temperature as will be later related to establish a bed temperature of 900° F. to 1150° F., is made up of suitable inert solid particles in the range of 20 to 400 micron particle size. This bed is fluidized by means of a gas such as steam entering the vessel at the bottom thereof via pipe 5. The fluidizing gas passes upwardly through the stripping section and the coking section proper and establishes the solids at a level "L." The fluidizing gas serves to strip vapors and gases from the coke which flows down into the stripping zone S from the coking section C. Any large agglomerates of coke which tend to interfere with the flow of fluidized particles are removed from the system via line 27.

Oil to be converted is preferably preheated to a temperature not above its cracking temperature (usually not above 750° F.). It is introduced into the bed of solid particles via spray or otherwise and preferably at a plurality of points in the system both circumferentially and vertically, at different levels in the vessel. The vapor resulting from the decomposition of the heavy oil after contact with the hot solids assist in the fluidization of the solids in the coking bed and add to its mobility and general turbulent state. The vapors pass upwardly through the bed and are removed from the coking vessel via line 8. The effluent removed via line 8 contains some droplets of an unconverted oil, heavy fractions of said oil, in addition to the gas and vapors of gasoline and gas oil produced in the process. The gaseous effluent is immediately contacted with a stream of cool solids preferably fluidized in a gas such as steam or light hydrocarbon vapor such as produced in the coking process. The cool solids are introduced via line 16 and preferably maintained at a temperature from 50° F. to 200° F. below the temperature of the effluent vapors. The cool solids immediately condense on their surfaces the unconverted heavy oil and the heavy ends of the product vapors in addition to any contaminant such as metal contaminants and some of the volatile components of the product. The combined streams are introduced via line 17 into a cyclone separator 18 or other similar gas-solids separator. The remaining unconverted effluent vapors pass overhead via line 19 as the principal coking products to a suitable fractionating device. The solids containing adsorbed material thereon are removed via line 20. A portion of the solids may be withdrawn from line 20 via line 21, cooler 22 and contacted with further amounts of gaseous effluent from the coker. However, the bulk of the solids are preferably removed to stripper 25 wherein they are countercurrently contacted with stripping steam introduced into the bottom of the vessel via line 24. The steam strips the adsorbed components from the solids and the latter are passed directly via line 23 into the bottom of the coking main vessel just above the stripping section thereof. The stripped solids are removed from vessel 25 via line 26 and returned with the aid of fluidizing gases entering via taps "t" to line 16 after being cooled in cooler 22'.

Overhead product vapors emerging from the cyclone or other separation device 18 are introduced into fractionator 30 and therein separated into a fuel gas fraction removed via line 31, a gasoline or naphtha fraction emerging via line 32 and a gas oil fraction removed via line 33. Bottoms are removed from the fractionator via line 34. The bottoms usually represent good catalytic cracking feed stock and this stream is usually diverted to the catalytic cracker. However, if the solids content of this stream rises to an appreciable extent a portion thereof is diverted via line 35 and returned to cyclone 18 as a slurry for removal of solids therefrom. Likewise, at least a portion of the bottoms may be returned via line 36 and line 4 to the coking vessel 2.

In order to maintain the necessary temperature in the coking vessel, a stream of solid particles containing adsorbed or condensed carbonaceous material is removed from the coking vessel via line 9. The removed material with the assistance of fluidizing gas such as air is conveyed to the burner 10, being introduced into the bottom thereof. Air or oxygen introduced via line 11 is employed to burn some of the carbonaceous materials from the solid particles and thereby raise the temperature thereof to a point sufficient to supply the heat for the endothermic reaction occurring in coking vessel 1. The hot solid particles at a temperature of approximately 200° F. higher than the coking temperature of vessel 1 are removed from vessel 10 and introduced into the coking vessel via line 3. In the burner 10 the solids are maintained in the fluidized state at a bed level L' in very much a similar manner to the behavior of the solids in the coking vessel 1. Combustion gases are removed from the burner via line 15 after passing through cyclone 13. Any entrained particles are returned to the bed via dip-leg 14. The net coke product of the process is removed from the burner via line 12, cooled and transported to storage. The amount of coke burned in the combustion zone depends upon the nature of the feed stock and the combustion temperature. In a typical installation about 5% on feed of coke is burned for heat purposes, which corresponds to 15% to 30% of the coke made depending on the feed stock.

Figure 2 shows a modification of the quench system. The system described with respect to the coking vessel, the contacting with cool solids, and the separation of gaseous product therefrom is the same as that described in Figure 1. In the modification of Figure 2, however, part or all of the solid quench particles containing condensed materials is returned from dip-leg 20 via line 38 directly to the coking bed. Alternatively, the quench particles may be introduced via line 27 by stripper 25 and stripped with steam entering vial line 24. Heavy ends stripped from the particles are removed via line 40. Solids are removed from the stripper via line 27 and are returned in whole or in part via line 26 after cooling to required temperature in cooler 22' to the solid quench line 16.

Although a cyclone 6 equipped with dipleg 7 has been shown in connection with the operation of vessel 1, this cyclone can be dispensed with and all solids, both quenched solids and entrained solids, may be removed by means of the operation of cyclone 18. A small amount of solids, equal to the entrained solids rate, may be returned from the quench system to the main coking bed to prevent excessive build up of the solids inventory in the quench system.

Of the two methods shown for stripping the condensed hydrocarbons from the quenched solid, it is preferred to utilize the process of Figure 1 in which the condensed hydrocarbons are stripped and the stripped material added to the coking bed rather than adding the solids containing condensed material directly to the bed. The latter operation is not preferred because of the added heat load imposed upon the coking bed since the added solids are at a temperature of about 50° F. to 200° F. lower than the coke reactor temperatures.

In the application of the present invention approximately the heaviest 10 volume percent of the overhead vapors are condensed on cool quench solids introduced into the overhead stream. The solids containing condensed heavy ends are separated from the uncondensed vapors in the cyclone. The solids are stripped with steam in the amount of 7 weight percent on fresh coker feed. The stripping is accomplished by countercurrent contact with the steam at 850° F. The mixture of stripped hydrocarbon and steam is returned to the coker vessel as indicated in the drawing. Instead of steam in a stripping operation it is also possible to employ water or a mixture of water and steam. In either case stripping of the hydrocarbons will be accomplished and at the same time the solids will be cooled by contact with the water resulting in the production of inexpensive steam. It is preferable to carry out the latter operation in a relatively small stripper containing perforated plates or coarse packing in order to obtain true countercurrent action. The cooled solids are, as in the former case, returned to the quench point.

The process of the present invention in addition to avoiding all of the difficulties of a liquid quench system also possesses an additional advantage in that the added quench solids provide a scouring action to prevent coke deposition in lines as well as providing surface for the deposition of heavy oil and other contaminants. By maintaining a solids to condensed oil ratio of 50:1 at a maximum and preferably at 10 to 25:1, no difficulties of agglomeration of quench particles is experienced. Contact time in the quench area is extremely short; in the order of ½ to 2 seconds, preferably 1 second, so that coking and product degradation is virtually eliminated. The recycle stream cut point can be readily varied by controlling the inlet temperature of the quench solids. Should any solid particles be lost overhead they will of course settle out at fractionator 30 and can be returned eventually to the coking vessel with the bottoms product recycled to the vessel or, preferably to the inlet of cyclone 18.

Another advantage of this process is that the entire coker overhead is suitable to be fed directly into a catalytic cracking reactor because the harmful ash and heavy ends have been removed. This would eliminate fractionator 30. Alternatively, a simple condensation of the coker overhead would separate the catalyst feed from the naphtha and lighter products without the expense of a conventional fractionator.

Use of porous solids in the quench system reduces the necessary circulation of quench solids. When these solids are adsorptive they will remove the necessary heavy ends from the coker overhead with less cooling required (i.e., at a higher temperature) than in the case of non-adsorptive solids.

What is claimed is:

1. A fluid coking process comprising introducing a heavy hydrocarbon oil into a mass of hot, finely divided, inert coke particles having a diameter in the range of about 20 to 400 microns maintained in a dense fluidized mass in a coking zone at a temperature of 850° F. to 1250° F. whereby the oil is converted into vaporous products and coke, separating the vaporous products containing unconverted oil and heavy fractions of the vaporous product from the coke particles, thereafter condensing a portion of the separated vaporous products by contacting said vaporous products with a cooler stream of finely divided, entrainable coke particles at a temperature in the range of 50° F. to 200° F. less than the vaporous products whereby unconverted oil and heavy portions of the vaporous products are condensed and deposited thereon, separating the residual uncondensed vaporous products from said cool coke particles containing uncondensed materials, stripping the condensed materials from the cool coke particles by the action of steam, and passing the stripped materials together with steam as fluidizing gas into the bottom of the coking zone.

2. The process of claim 1 wherein the ratio of cooling solids to condensed oil utilized is in the range of 10 to 25/1.

References Cited in the file of this patent

UNITED STATES PATENTS

| | | |
|---|---|---|
| 2,376,190 | Roetheli | May 15, 1945 |
| 2,436,160 | Blanding | Feb. 17, 1948 |
| 2,471,104 | Gohr | May 24, 1949 |
| 2,485,315 | Rex et al. | Oct. 18, 1949 |